United States Patent [19]

Hamilton

[11] 4,453,751

[45] Jun. 12, 1984

[54] STRIKE PLATE SUPPORT SYSTEM

[76] Inventor: William J. Hamilton, 1180 Woodroffe Ave., Ottawa, Ontario, Canada, K2C 2T3

[21] Appl. No.: 348,948

[22] Filed: Feb. 16, 1982

[51] Int. Cl.³ .......................................... E05C 13/00
[52] U.S. Cl. ................................................ 292/340
[58] Field of Search ............. 292/340, 341.18, 341.19, 292/346

[56] References Cited

U.S. PATENT DOCUMENTS 1,869,815  8/1932  Katz .............................. 292/341.18
2,743,953  5/1956  Marra et al. ................. 292/341.18 X Primary Examiner—Richard E. Moore
Attorney, Agent, or Firm—W. Irwin Haskett

[57] ABSTRACT

A securing mechanism and method for a conventional door frame strike support structure, which substantially increases the holding strength of the strike and mounting assembly. The mechanism comprises two support members that are secured and concealed within the frame jamb structure behind the strike plate in a horizontal position parallel to the body of the strike plate, and with transverse interconnecting threaded means to adjustably secure the strike plate. The final assembly is ready to act with a high degree of mechanical resistance in direct opposition to any external force applied against the door. The strike support system is versatile, being adaptable to various existing designs of strike plates and deadbolt keeper plates and even for different levels of tensile strength.

11 Claims, 4 Drawing Figures

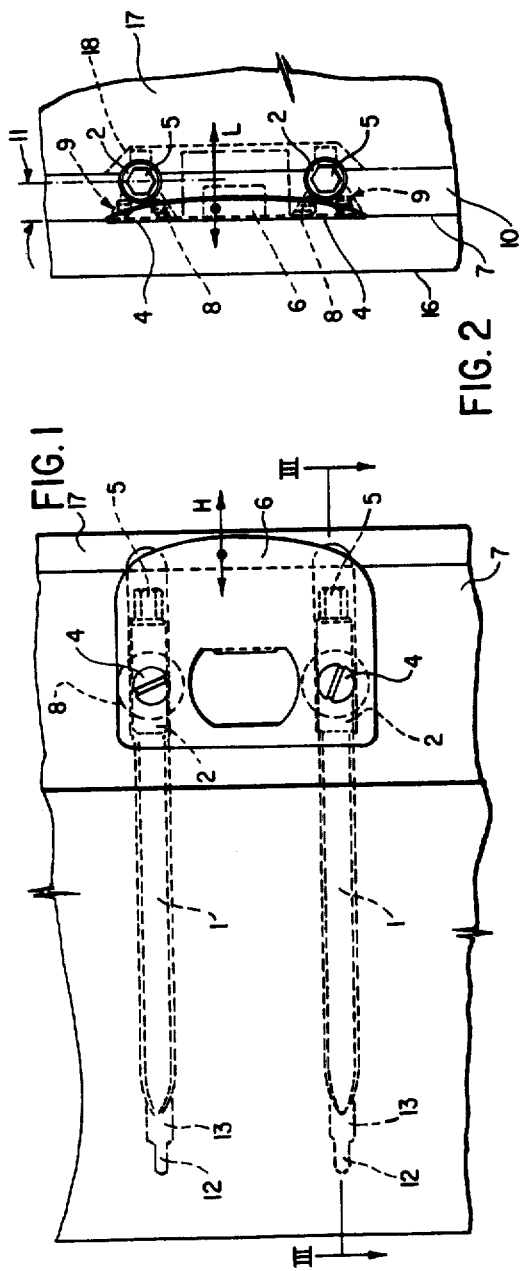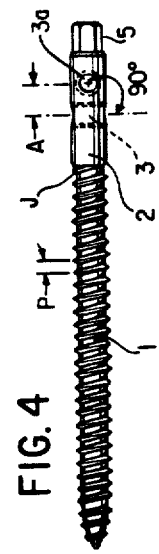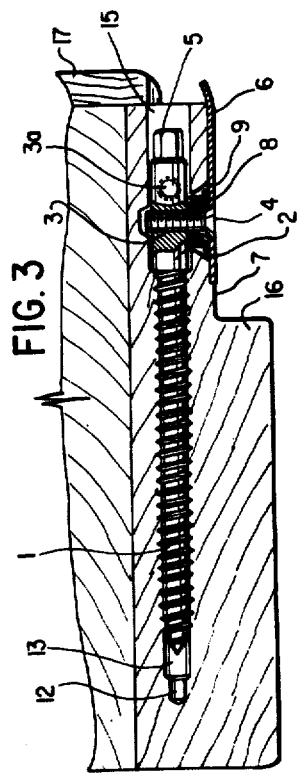

STRIKE PLATE SUPPORT SYSTEM

BACKGROUND OF THE INVENTION

The present invention relates to a securing system for a conventional doorjamb strike plate, and more particularly relates to a device which provides greater strength for a strike plate mounted in a door frame jamb structure.

In recent years, greater attention has been given to providing increased security to homes against unauthorized entry. For example locks have been made with longer and heavier bolts in order to provide increased security. The security actually realized with such locks however has been limited because the lock bolt is commonly received in a strike or keeper plate mounted on or in a relatively weak wooden doorjamb which can be broken apart by a moderate blow to the door.

While it is known to provide strikes of larger size having more screws and made of thicker metal to replace the common strike, many of these devices require the screws to be set into this same relatively weak wood. Again the system can still be broken apart by a moderate blow to the door. Excessive remodelling, if not replacement of the frame jamb altogether because of the weakness, would be required.

Moreover, many of these devices require screws to be set into wood at right angles to the strike body. Because the grain in wood usually runs vertically within the door frame parallel with the vertical line of the strike plate mounting screws, any lateral stress applied to these screws tends to concentrate in a way that splits the wood along this weaker plane.

Attempts have been made to strengthen conventional strike plates. For example, Hansen U.S. Pat. No. 4,211,442 issued July 8, 1980, and Detlefs U.S. Pat. No. 4,186,954 issued Feb. 5, 1980, describe and illustrate strike plate assemblies in which extensions or brace members projecting perpendicularly to the plane of the main body of the strike plate, extend behind it into the adjoining wall support, thereby providing greater security against displacement of the strike plate. Payne U.S. Pat. No. 2,533,396 issued Dec. 12, 1950 describes and illustrates a further construction of strike plate, this one being of a construction which is releasable by a person on one side of the door frame so that that person may disassemble the strike plate if for instance that person is locked in. All of these constructions of strike plates require a special construction of strike plate to be used in conjunction with the supporting structure, such that a simple, conventional existing strike plate cannot be used.

Accordingly it is an object of the present invention to provide a low cost, high strength securing mechanism applicable to most common frame jambs and strike plates or bolt keepers, requiring only the simplest of modification to the jamb itself. It is also an object of this invention to provide a method for strengthening the security provided by a conventional doorjamb strike plate.

SUMMARY OF THE INVENTION

While the conventional strike plates usually have the feature of screws set into the weak section of wood directly adjacent the strike at right angles to the strike, according to the present invention an improved means of support is provided for a strike plate in which the plate is secured to a mechanism which in effect is aligned in a direction which directly opposes any transverse external force applied to the door and latch bolt against the strike and which distributes the forces on the strike evenly over a relatively large area of the frame jamb. The system according to the present invention is usable even in soft wood where it still develops better strength for securing the strike.

According to the present invention, a securing mechanism or system is provided for a doorjamb strike plate or bolt keeper comprising a pair of similar elongated strike support members. These strike support members are provided with means for being secured horizontally within the doorjamb behind the strike plate and in a plane parallel to that of the body of the strike plate. They are also provided with threaded apertures alignable in a direction perpendicular to that of the longitudinal axis of the strike support member. The mechanism also includes screw means to extend through the holes of the strike plate and threadably engage the apertures to secure the strike plate to the strike support members when in position.

In a preferred embodiment of the present invention, the strike support members each comprise an elongated wood screw having a thread section, a head for receiving a driving tool and a cylindrical body section between the head and thread section. The apertures are transversely centered through the longitudinal axis of the strike plate support means in the body section.

The method of the present invention to provide a high strength means to support a strike plate in a frame jamb of an entrance doorway comprises drilling horizontal first holes into the frame jamb parallel to and behind the strike mounting surface and perpendicular to the face of the jamb in order to completely receive the strike support members, in spaced position. That position is determined by the distance between and location of the screw holes of the strike plate when in position on the doorjamb. The next stop consists of drilling countersunk second holes in the jamb perpendicular to the plane of the strike mounting surface and aligned with the screw holes of the strike when in position, each of these second holes being drilled through to the corresponding first holes. The strike plate support members are then completely driven into the first holes and positioned so that the apertures of each are aligned with the corresponding countersunk second holes. Lastly, the strike plate is secured in position with its screw holes aligned with the respective second holes and apertures, passing screw means through the plate screw holes to engage in the respective apertures of the support members.

The present invention provides a mounting mechanism of high strength for a door strike plate, which is easily installed without the need for extensive frame jamb alterations. As will be described in more detail subsequently, the device may be incrementally adjusted during installation to allow for easy positioning of the strike on the frame jamb. When installed, the support structure provides resistance in a line which directly opposes any transverse external force applied to the door and latch bolt against the strike. Thus, the structure provides additional strength over many prior art strike support structures in that it does not depend for its strength on the strength of the weaker plane in wood but rather on the compressive strength of a relatively large cross-section of a wooden door frame structure. The invention described herein distributes the connection evenly over a fairly large are of the frame jamb, and is usable even in soft wood where it still develops good strength for mounting an existing strike or deadbolt keeper plate. When installed, the mechanism may be completely hidden within the frame jamb structure.

The device according to the present invention is applicable to a variety of wooden frame jambs, and replaces, as desired, the existing method of attaching strike plates or other bolt keepers to the outer edge of jambs where more strength may be difficult to provide in adequate measure.

BRIEF DESCRIPTION OF THE DRAWINGS

Other objects and advantages of the invention will become apparent upon reading the following detailed description and upon referring to the drawings in which:

FIG. 1 is an elevation of a frame jamb in the area of the strike plate, showing a strike plate mounted in accordance with the present invention;

FIG. 2 is a right-hand elevation view of the strike plate of FIG. 1;

FIG. 3 is a section view of the strike plate of FIG. 1 along line III—III; and

FIG. 4 is a side view of one of the strike support members used to secure the strike plate in accordance with the present invention.

While the invention will be described in connection with example embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE INVENTION

In the following description, similar features have been given similar reference numerals.

Turning to FIG. 1 there is shown a securing mechanism for a conventional doorjamb strike plate 6. The mechanism comprises a pair of elongated strike support members 1 each being in the shape of a long wood screw having a threaded portion as illustrated (FIGS. 3 and 4). Strike supports 1 are provided with cylindrical body sections 2 in which are threaded apertures 3 and 3a, these apertures being centered on and passing through the longitudinal axis of the strike support member 1. The strike support body 2 is shown to be of circular cross-section in FIG. 2, but might alternatively be of other shapes, e.g. square in cross-section if required to provide more strength for fasteners 4, or a better mounting surface for spacer washers 8. Straight body section 2 can be made longer if it is required to provide extra strike attaching screws, for example in a larger strike plate. Threaded holes 3 and 3a receive strike fastening screws 4, as will be described in more detail hereinafter. Strike support member 1 is provided with a hexagonal shaped head 5 (FIG. 2) which is driven by a hexagonal nut driver to facilitate screwing of strike support members 1 to their proper locations in the doorjamb as shown in FIGS. 1 and 3. The diameter and overall length of strike support member 1 may be made larger or smaller, as required for a particular application.

Threaded holes 3 and 3a are spaced from each other by a dimension A (FIG. 4) which is relative to the thread pitch P of the threaded portion of strike support member 1. The first of these holes may be located, for example, at a distance of approximately one body 2 diameter from the junction J of body section 2 and the threaded section of member 1. The axis of the seconded threaded hole 3a is angularly positioned with respect to the axis of hole 3 at an angle of 90°, i.e. so that the respective axes of these holes are at 90° to each other. This arrangement provides that the alignment of holes 3 or 3a, and consequently the horizontal position of the strike, will be very closely adjustable in the directions H (FIG. 1) to any required location for proper latch bolt-to-strike engagement.

In the elevation view of FIG. 2, it can be seen that the strike supports 1 are located the same vertical distance apart as the vertical distance between the screw holes of standard strike plate 6. This dimension is used during installation to locate guide marks on the jamb surface 10 located on a vertical line approximately as shown as reference numeral 11 from the jamb surface 7. This vertical locating line may be placed closer to jamb surface 7 if the jamb is built with a door stop 16 as shown, which door stop is integral with or made solidly as a part of the main jamb structure. This closer placement of strike support member 1 to surface 7 will reduce the number of spacer washers 8 required and also the depth of countersink required (as will be hereinafter described) for these washers. Spacer washers 8 permit lateral adjustment in the direction L (FIG. 2) to locate the strike plate 6 flush with jamb surface 7. The stresses to be withstood by strike fastener screws 4 are easily managed by the use of high strength fasteners, supplied together with spacer washers as part of the strike support device.

Strike support member 1 may for example have a screw section of a common 5/16 inch lag screw, and fasteners 4 may be of size number 10–32 stainless flathead machine screws or other similar high strength screws.

On installing the device according to the present invention, pilot holes 12 and thread root diameter holes 13 (FIGS. 1 and 3) are drilled horizontally into the frame parallel to the jamb surface 7. Holes 13 are enlarged to at entrance end 15 to allow entry of strike support body section 2 as shown. Drilling of these pilot holes prevents splitting the frame jamb and also reduces the torque required to drive the strike support to its final location. Hole entrance 15 may also be slightly larger for a short distance inward from surface 10 to allow entry of a driving tool for the hexagonal end 5 of the strike support device. However these holes can be filled with a wood filler and repainted to restore the jamb to its original unbroken appearance as required, after the strike support device has been installed.

As can be seen in FIG. 2, where these two holes are positioned such that they would otherwise be drilled through a portion of cover plate 17 of the frame jamb to wall assembly, a section of cover plate 17 can also be chiselled and split out as shown by broken line 18 (FIG. 2), to leave a flat working surface for marking and drilling of the jamb surface 10. However, after the strike supports have been installed, the removed section of outline 18 may be replaced or refilled with wood filler in the same way as the holes.

A pair of second holes 9 (FIGS. 2 and 3) are also formed in the jamb, these holes being perpendicular to the plane of surface 7 and aligned with the screw holes of strike plate 6 when in position. These holes 9 are countersunk to form a cavity as illustrated to also receive spacer washers 8. The spacer washer cavity may also be filled at final assembly of strike plate to mounting, with any non-shrinking hard setting material like auto-body filler or metal filled epoxy, to add to the overall strength of the support structure.

In order to mount the strike 6, the position of either of the threaded holes 3 or 3a must be aligned with the corresponding fastener hole in strike plate 6. Since a half turn of support member 1 results in movement in direction H of half the dimension of thread pitch P, the second hole 3a is located with respect to hole 3 such that an overall adjustment resolution of plus or minus ¼ of thread pitch P is achieved. The thread pitch of a common 5/16 inch diameter lag screw is approximately 0.110 inches. Consequently the adjustment resolution of this arrangement is 0.0275 inches - slightly less than 1/32 inches.

The 90° of angular displacement of hole 3 with respect to hole 3a also eliminates a concentration of holes in the same orientation along the strike support member 1 and evenly distributes a holding strength for strike attaching fastener in either hole.

The holding strength of the 5/16 inch wood screw 1 as seen in FIG. 3 has been tested in soft white pine wood and found to be greater than 200 pounds per lineal inch of screw thread portion, or 1200 pounds total for the two members shown (each having three inches of thread). This approaches the residual strength of a common 18 ga. steel strike.

Thus there has been provided in accordance with the invention a securing system for a conventional doorjamb strike plate that fully satisfies the objects, aims and advantages set forth above. While the invention has been described in conjunction with specific embodiments thereof, it is evident that many alternatives, modifications and variations will be apparent to those skilled in the art in light of the foregoing description. The strike support members 1 may also be used in single form rather than in pairs, as either a main support mechanism or as an auxillary support member, in combination with other door frame mounted accessories such as door hinges. For example, on a door hinge, a single support member would replace one of the three or more wood screws normally used, to reinforce each frame mounted hinge leaf. Accordingly, it is intended to embrace all such alternatives, modifications and variations as fall within the spirit and broad scope of the appended claims.

What I claim as my invention:

1. A securing mechanism for a doorjamb strike plate or bolt keeper with holes for securing means, the system comprising:
    (a) A pair of similar elongated strike support members, each provided with:
        (i) means for being secured within the doorjamb horizontally behind a location where a strike plate or bolt keeper is to be secured and in a plane parallel to that of the body of the strike plate or bolt keeper, and
        (ii) threaded aperture means through the longitudinal axis of the member; and
    (b) screw means to pass through the holes of the strike plate or bolt keeper and be threadably engaged by the aperture means to secure the strike plate to the strike support members at the location on the doorjamb.

2. A securing mechanism according to claim 1 wherein the strike support members each consist of an elongated wood screw having a thread section, a head for receiving a driving tool to enable its insertion into its position into the doorjamb, and a straight body section between the head and thread section in which body section the aperture means is transversely centered through the longitudinal axis of the strike support members.

3. A mechanism according to claim 2 wherein the head is of hexagonal form to receive a hexagonal nut driver.

4. A mechanism according to claim 2 wherein the body section is cylindrical.

5. A mechanism according to claim 2 wherein two or more similar threaded apertures are provided in each strike support member, the apertures being spaced from each other in the body section and oriented, with respect to each other's axis, as different angular positions.

6. A mechanism according to claim 5 wherein two similar apertures are provided in each strike support member, and the axes of the apertures are perpendicular to each other.

7. A mechanism according to claim 6 wherein the apertures in each strike support member are spaced a distance from each other which distance is relative to the thread pitch of the thread section of that support member whereby the horizontal position apertures, and hence of the strike plate, is closely adjustable.

8. A mechanism according to claim 1 further provided with adjustment means to fit between the inner surface of the strike plate and the strike support member to provide a surface flush with that of the jamb surface upon which the strike plate is to fit, against which the screw means may tighten the strike plate when in position.

9. A mechanism according to claim 8 wherein the adjustment means comprises washers through which the screw means fit when in position.

10. A mechanism according to claim 1 wherein the screw means comprise machine screws.

11. A mechanism according to claim 1 or 2 further comprising a conventional strike plate comprising a latch receiving hole and vertically spaced screw receiving holes.

* * * * *